United States Patent [19]

Woyciesjes et al.

[11] Patent Number: 5,510,036

[45] Date of Patent: *Apr. 23, 1996

[54] PROCESS FOR TREATMENT OF AQUEOUS SOLUTIONS OF POLYHYDRIC ALCOHOLS

[75] Inventors: Peter M. Woyciesjes, Woodbury; Aleksei V. Gershun, Danbury; Stephen M. Woodward, Lakeside, all of Conn.

[73] Assignee: Prestone Products Corporation, Danbury, Conn.

[ * ] Notice: The term of this patent subsequent to 6-29-90 has been disclaimed.

[21] Appl. No.: 83,959

[22] Filed: Jun. 28, 1993

Related U.S. Application Data

[63] Continuation of Ser. No. 564,262, Aug. 8, 1990, Pat. No. 5,223,144.

[51] Int. Cl.$^6$ ........................................................ G02F 9/00
[52] U.S. Cl. .......................... 210/664; 210/665; 210/666; 210/669; 210/688; 210/694; 210/724; 210/725
[58] Field of Search ................................ 210/664–669, 210/688, 724–728, 743, 806, 694

[56] References Cited

U.S. PATENT DOCUMENTS

| | | | |
|---|---|---|---|
| 3,575,854 | 4/1971 | Richards | 210/724 |
| 4,946,595 | 8/1990 | Miller | 210/651 |
| 5,223,144 | 6/1993 | Woyciesjes et al. | 210/664 |

*Primary Examiner*—Ivars Cintins
*Attorney, Agent, or Firm*—Cummings & Lockwood

[57] ABSTRACT

The process relates to the treatment of aqueous solutions of polyhydric alcohols to remove heavy metal components, oils, organic contaminants and, optionally, water. The process is particularly well suited for use in the treatment of spent antifreeze/coolant from the cooling systems of internal combustion engines.

30 Claims, No Drawings

5,510,036

PROCESS FOR TREATMENT OF AQUEOUS SOLUTIONS OF POLYHYDRIC ALCOHOLS

This application is a continuation of prior U.S. application Ser. No. 07/564,262 filing date Aug. 8, 1990, now U.S. Pat. No. 5,223,144.

FIELD OF THE INVENTION

The instant invention relates to a process for the treatment of aqueous solutions of polyhydric alcohols, e.g. ethylene glycol, containing contaminant(s), particularly a heavy metal such as lead, copper, iron, zinc and non-heavy metals such as aluminum. The instant invention is particularly useful in treatment of an antifreeze/coolant removed from heat exchange systems, including those of automobiles and trucks.

INFORMATION DISCLOSURE STATEMENT

Considerable interest has been associated with the purification of numerous polyhydric alcohols in relation to their manufacture. In particular, the purification of aqueous ethylene glycol has received considerable attention owing to the commercial significance of ethylene glycol in the manufacture of polyester.

U.S. Pat. No. 3,732,320 discloses a purification process for reducing the iron content of ethylene glycol from an ethylene glycol manufacturing process. The process involves contacting ethylene glycol with a cation exchange resin in the acid cycle. Although the removal of iron was of primary concern to the patentee, the patentee generally states that "iron and other metallic contaminants present in trace amounts" may be removed by the cation exchange treatment.

U.S. Pat. No. 4,118,582 discloses a recovery process for removing dissolved antimony catalyst from unreacted ethylene glycol recovered from the manufacture of polyester. The recovery process involves a pH adjustment of the spent glycol to about 2 to 7, reaction with an alkali metal borohydride to form a metallic antimony precipitate, separation of the metallic antimony precipitate from the spent glycol (unreacted ethylene glycol from the manufacture of polyester) in the absence of oxygen, followed by distillation of ethylene glycol from the spent glycol.

U.S. Pat. No. 4,260,827 discloses a process for the purification of aqueous solutions of low molecular weight polyhydroxyl compounds. The patentee's process is directed to the purification of low molecular weight polyhydroxyl compounds after their manufacture in the presence of catalysts containing calcium and/or lead. The patentee's process involves numerous treatment and distillation steps. The aqueous solution of the low molecular weight polyhydroxyl compound is first treated with methanol and a precipitant to form a precipitate to be separated from a residual solution. The pH of the methanol/precipitant solution of low molecular weight polyhydroxyl compounds may be adjusted to a pH from 1 to 4 to maximize precipitation of the calcium and/or lead compounds from the methanol treated solution. The deposits (precipitates) are removed by filtration and the residual solution treated with a cation exchanger. The residual solution is then distilled to remove low-boiling fractions. The distillation sump essentially containing the low molecular weight polyhydroxyl compounds is then treated with an anion exchanger.

The above processes have been directed to manufacturing processes where a manufactured product is being purified or where there is a need to purify and recover unreacted raw materials from specific reagents present as a result of commercial processes. Such processes deal with purification of compositions with limited and well understood contaminants.

The purification of more ethylene glycol-containing streams from automotive cooling systems raises significantly more complex questions as to the contaminants to be removed by treatment. For example, the purification of a spent antifreeze/coolant is a dramatically different treatment process owing to the novel and harsh environment to which the antifreeze/coolant has been subjected and, further, owing to the specific and unique chemical components commonly present in the spent antifreeze/coolant to be treated. Owing to the complexities associated with treating a spent antifreeze/coolant it is not surprising that few attempts have been made to treat spent antifreeze/coolant solutions.

U.S. Pat. No. 4,791,890 discloses a flushing process (employing a flushing liquid having entrained gas bubbles) for an automotive cooling system wherein the patentee includes a filtering step (at 302). The patentee provides no other treatment of the spent antifreeze coolant. U.S. Pat. No. 4,793,403 discloses a coolant system for use in treatment of coolant liquid. The liquid coolant is treated by filtering to remove contaminant from the coolant liquid. The patentee discusses a chemical treatment at column 3, lines 11 to 28, but only in vague terms and only by addition of chemical components previously present in the original antifreeze/coolant, i.e., addition of new additives. The patentee discloses removal of particulate and congealed substances through a filter (28) followed by treatment of aqueous liquid by addition of chemical agent or agents. The patentee does not disclose any particular treatment, merely alluding to the fact that such chemicals can include corrosion inhibitor, i.e., anti-met compound, pH adjustment chemicals, and fresh antifreeze compound (glycol, for example). In addition, at column 3, lines 38 to 48, filter 41 may contain "metal powder" to provide metallic ions for neutralizing electrical charge. Similarly, Kleer-Flo Company has published the details of a antifreeze recycle machine (Kleer-Flo® AF 250 Anti-Freeze Recycler) which employs a three step filtration system which employs a stainless steel screen filter, a pre-filter for removing materials down to a size of 5 microns and a third filter alleged to remove impurities at the molecular level (approximately 50 Angstoms). After filtration the filtered antifreeze is mixed with an additive package to provide a working antifreeze for reintroduction into an automotive cooling system. No chemical removal process is disclosed whereby the purification of the spent antifreeze/coolant is achieved.

The above discussion of the prior art demonstrates the failure of the prior art to disclose an effective process for the purification of used ethylene glycol-based heat exchange fluids, particularly used spent antifreeze/coolant from automotive cooling systems. It is particularly useful to note the lack of effective treatment steps of the spent antifreeze/coolant in U.S. Pat. No. 4,793,403 and by the Kleer-Flo® AF 250 Anti-Freeze Recycler for contaminants such as heavy metals and organic compounds other than ethylene glycol. Further, such processes specifically warn against their use when the spent antifreeze/coolant to be treated contains an oil component. Such a limitation of use significantly detracts from the commercial use of such processes.

SUMMARY OF THE INVENTION

The instant process relates to the treatment of aqueous polyhydric alcohol-containing compositions. In one embodiment the polyhydric alcohol-containing compositions are from a heat exchange system of an internal combustion engine which typically contains between about 5 weight percent and about 95 weight percent ethylene glycol, and contains at least one metal, typically a heavy metal, and/or an oil component to be removed.

The instant process generally comprises steps of:

(i) adjusting the pH of said polyhydric alcohol-containing composition to between about 4.0 and about 7.5 by addition of an effective amount of an pH adjusting agent to form a pH-adjusted composition; and (ii) adding an effective amount of a precipitating agent for at least one metal, preferably at least one heavy metal, and/or oil component present in the pH-adjusted composition; and (iii) preferably also includes adding to the pH-adjusted composition of step (ii) an effective amount of a coagulating agent and an effective amount of a flocculating agent effective in forming a precipitate containing at least one metal; and (iv) passing the pH-adjusted composition through a first filtration means to remove a major amount of said metal-containing precipitate and, optionally, physical skimming of the surface of said pH-adjusted composition to remove precipitate at said surface.

In addition to the above steps the instant treatment process may also include one or more of the following steps:

(v) passing the pH-adjusted composition from the first filtration means through a second filtration means effective in the physical separation of particles of a smaller size that said first filtration means;

(vi) passing the pH-adjusted composition after the second filtration means through an organic separation means effective in removing organic compounds (other than the polyhydric alcohol(s)) from the pH-adjusted composition;

(vii) passing said pH-adjusted composition through a third filtration means having an effective physical separation of particles by size smaller than said second filtration means; and (viii) passing said pH-adjusted composition after filtration through an ion exchanger anion and/or cation effective in the removal of at least one solubilized metal, preferably heavy metal, from said pH-adjusted composition.

DETAILED DESCRIPTION OF THE INVENTION

At the outset it is important to note that although the instant invention is primarily directed to the treatment of spent antifreeze/coolant from the heat exchange systems (commonly referred to as "cooling systems") of internal combustion engines, the process of the instant invention is useful in purifying a wide range of contaminated aqueous ethylene glycol composition.

The term "heat exchange system" is employed herein to include any heat exchange system and includes cooling systems for internal combustion engines, as commonly employed in automobiles, trucks, motorcycles, airplanes, trains, tractors, generators, compressors and the like. The cooling system in automobiles and trucks are representative of such heat exchange systems for internal combustion engines. Automotive heat exchange systems and their construction are well known in the art and are known to contain several metals, including aluminum and lead solder which with time may be dissolved into the working antifreeze/coolant composition within the cooling system by physical abrasion and/or chemical action. The term "spent antifreeze/coolant" herein refers to an antifreeze/coolant which has operated as the antifreeze and/or coolant for a time in a heat exchange system, including an automotive cooling system.

The term "metals" as used herein in reference to the metal components present in the spent antifreeze/coolant includes metals such as aluminum and magnesium and "heavy metals" such as lead, iron, zinc, manganese, copper and molybdenum. Although aluminum is not a "heavy" metal as that term is understood in the prior art, the term "heavy metal" as used herein is intended to include aluminum as to the metal components present in a spent antifreeze/coolant which are subject to removal by the instant process. Owing to the construction of a cooling system so as to include aluminum surfaces in contact with a working antifreeze/coolant, it is common for the spent antifreeze/coolant to contain aluminum.

The antifreeze/coolant employed in heat exchange systems is generally a mixture of an alcohol (including methanol, ethanol, propanol, butanol, ethylene glycol, diethylene glycol, propylene glycol, dipropylene glycol, glycerol, butene glycol, the monoacetate of propylene glycol, the monoethylether of glycol, the dimethyl ether of glycerol, alkoxy alkanols and mixture thereof); with the preferred alcohols being selected from the group consisting of ethylene glycol, diethylene glycol, propylene glycol, dipropylene glycol and mixtures thereof, and preferably consists of ethylene glycol, water and additional chemical components which provide corrosion protection or other beneficial function for the particular heat exchange system(s) wherein it As employed. Further, At is well known that up to about 10% diethylene glycol or higher may be present in the grade of ethylene glycol employed to manufacture antifreeze/coolants for cooling systems.

Owing to the wide spread use antifreeze/coolants in internal combustion engine cooling systems based upon ethylene glycol/water mixtures, the instant invention is particularly useful in conjunction with ethylene glycol-based antifreeze/coolants heretofore employed as heat exchange fluids for the cooling systems of internal combustion engines. Such ethylene glycol-based antifreeze/coolants representative of such antifreeze/coolant compositions are those containing silicone/silicate additives and/or various carboxylic acids as corrosion inhibitors for the automotive cooling systems. Other optional additives are typically employed in commercial antifreeze/coolants in minor amounts of less than 50 wt. percent based on the weight of the antifreeze/coolant. Typical optional additives included in antifreeze/coolants include, for example, known corrosion inhibitors for aluminum or other metals include, for example, molybdates, mono and/or di-aliphatic acids, e.g., sebacates, carbonates, silicates, alkali metal nitrates, alkali metal nitrites, diisopropylamine nitrite, dicyclohexylamine nitrate, tolyltriazole, mercaptobenzothiazole, benzotriazole, zinc compounds, calcium compounds, phosphates, benzoates, and the like, or mixtures thereof. Further, one or more of the known inhibitors for various metals are in an "inhibitory effective amount", i.e., an amount sufficient to provide a measurable amount of corrosion inhibition with respect to the metal (e.g., copper, steel, brass, aluminum, cast iron, solder, etc.) surfaces to be protected as compared to the corrosion protection provided by the antifreeze/coolant without these inhibitors. Other optional additives that may be present in commercial antifreeze/coolants include: wetting agents and surfactants such as, for example, known ionic and non-ionic surfactants such as the poly(oxyalkylene) adducts of fatty alcohols; defoamers and/or lubricants such as the well-known polysiloxanes and the polyoxyalkylene glycols; wear inhibitors, such as the zinc dithiophosphates and the zinc thiocarbamates; lubricants, such as silicone pump lubricants; and other ingredients known in the art of antifreeze/coolants that do not adversely affect the antifreeze/coolant characteristics sought to be achieved by the end use of the antifreeze/coolant.

Representative antifreeze/coolant compositions based upon polyhydric alcohols which may be treated according to the instant invention after use in a heat exchange system, i.e., when collected after use (e.g., a "spent" antifreeze/coolant from an automotive cooling system) include, but are not limited to, those described in U.S. Pat. Nos. 4,664,833, 4,287,077, 4,725,405, 4,704,220, 4,684,474, 4,685,475, 4,687,590, 4,701,277, 4,561,990, 4,578,205, 4,584,119, 4,587,028, 4,588,513, 4,592,853, 4,629,807, 4,647,392, 4,657,689, 4,759,864, 4,851,145, 4,810,406 and 4,345,712; the aforementioned patents incorporated herein by reference. In the aforesaid patents are disclosed combinations of chemical components effective in protecting the metal surfaces of such cooling systems, such being generally referred to as an "inhibitor package."

The spent antifreeze/coolant mixtures obtained by removal from heat exchange systems of internal combustion engines are generally characterized as containing ethylene glycol or other polyhydric alcohol(s) and are typically a mixture containing between about 95 volume percent and about 5 volume percent ethylene glycol and/or other polyhydric alcohol, preferably between about 30 volume percent and about 70 volume percent. The actual amount of ethylene glycol and/or other polyhydric alcohol present in the antifreeze/coolant will depend on several factors. For example, during the "change-over" of an antifreeze/coolant in the cooling system of an internal combustion engine the cooling system will be emptied and the removed antifreeze/coolant placed in a collection container. The cooling system will typically then be flushed with water and/or water with a minor amount of a cleaning agent. This substantially water solution will typically be emptied into the same holding container as the original spent antifreeze/coolant and, thus, further decrease the ethylene glycol concentration in liquid mixture to be recycled. Further, the spent antifreeze/coolant is typically characterized as containing at least one heavy metal selected from the group consisting of lead, iron, zinc, manganese, copper, molybdenum, and aluminum and various organic oils from the internal combustion engine or present as a result of contamination after removal of the antifreeze/coolant.

The antifreeze/coolant will also typically contain one or more organic compounds other than the polyhydric alcohol(s) component. Such organic compounds may be present as a result addition as a functional additive to the original antifreeze/coolant or may be present as a degradation product of the polyhydric alcohol, e.g., ethylene glycol, or other organic compound present in the original antifreeze/coolant. For example, it is well known that under the working conditions that an antifreeze/coolant experiences in an automotive cooling system that thermal degradation of ethylene glycol and other organic compounds present in the working antifreeze/coolant will result in the presence of organic degradation products. Typical organic degradation products of ethylene glycol include, but are not limited to, formic acid, glycolic acid and acetic acid. Antifreeze/coolants also are known to contain inorganic components as corrosion inhibitors including, but not limited to, silicate, nitrate, nitrite, silicone compounds, phosphate, chloride, sulfate, carbonate and mixtures thereof, and salts commonly found in water.

Analyses of spent antifreeze/coolants taken from commercial antifreeze/coolant change-over (including flushing liquids, e.g., water), are set forth in Table A:

TABLE A

| Component[2] | Low Value[3] | High Value[3] | Average Value[1, 3] |
|---|---|---|---|
| pH | 8.5 | 10.0 | 9.3 |
| Wt. % EG | 12.1 | 40.0 | 28.8 |
| Wt. % DEG | 0.5 | 3.5 | 1.37 |
| Wt. % PG | ND | 2.02 | 0.96 |
| TSS | 64 | 1846 | 544 |
| $NO_2$ | 10 | 50 | 15 |
| $NO_3$ | 56 | 740 | 469 |
| P | 125 | 730 | 438 |
| Cl | 1 | 31 | 18.5 |
| F | ND | 9 | 5 |
| Sulfate | 22 | 169 | 100 |
| B | 67 | 258 | 164.4 |
| Cu | 2.0 | 15.9 | 6.1 |
| Fe | 7.6 | 583 | 82.5 |
| Al | 1.8 | 71.3 | 13.7 |
| Pb | 1.5 | 136 | 25.6 |
| Ca | 1.5 | 34.1 | 9.13 |
| K | 234 | 1406 | 745 |
| Mg | 0.9 | 19.9 | 5.9 |
| Mo | 3.6 | 56.8 | 17.8 |
| Na | 676 | 2074 | 1420 |
| Si | 40.8 | 269.1 | 126.8 |
| Sn | 0.9 | 24.7 | 11.8 |
| Zn | 1.1 | 27.6 | 5.8 |
| TTZ | 130 | 370 | 242.7 |
| Acetate | 12 | 219 | 48.9 |
| Glycolate | 121 | 858 | 503 |
| Formate | 2 | 241 | 129 |
| Benzoate | 10 | 2590 | 385 |
| EDTA | 40 | 64 | 46 |
| Oil | ND | 1.0 | 0.03 |

[1]Low, High and Average Values (in ppm except where shown as wt. %) are based upon thirty (30), 55 gallon antifreeze/coolant samples taken from collection tanks at commercial antifreeze/coolant businesses in the United States of America.
[2]Abbreviations have the following meaning: % EG = Weight Percent Ethylene Glycol; DEG = Diethylene Glycol; PG = Propylene Glycol; $NO_2$ = Nitrite; $NO_3$ = Nitrate; Cl = Chloride; F = Flouride; P = Phosphorus; B = Boron; Cu = Copper; Fe = Iron; Al = Aluminum; Pb = Lead; TTZ = Tolyltriazole; EDTA = Ethylene Diamine Tetracetic Acid; and Oil = weight percent oil as an insoluble organic phase; TSS = Total Suspended Solids (ppm; gravimetric analysis with 0.45 micron filter); and ND = below detection limit of 2 ppm.
[3]Concentrations are in parts per million (ppm). All components are given as total of soluble and insoluble forms.

In one embodiment the polyhydric alcohol-containing compositions are taken from a heat exchange system, preferably the cooling system of an internal combustion engine, and contains between about 5 weight percent and about 95 weight percent polyhydric alcohol, preferably ethylene glycol, containing at least one heavy metal and typically containing an oil component. The instant process generally comprises the steps of:

(i) adjusting the pH of said polyhydric alcohol-containing composition to between about 4.0 and about 7.5 by addition of an effective amount of an pH adjusting agent to form a pH-adjusted composition; and (ii) adding an effective amount of a precipitating agent for at least one heavy metal and/or oil component present in the pH-adjusted composition.

In addition to the above steps the instant treatment process also may include one or more of the following steps:

(iii) preferably also includes adding to the pH-adjusted composition of step (ii) an effective amount of a coagulating agent and an effective amount of a flocculating agent effective in forming a precipitate containing at least one heavy metal;

(iv) passing the pH-adjusted composition through a first filtration means to remove a major amount of said heavy metal-containing precipitate;

(v) passing the pH-adjusted composition after the first filtration means through an organic separation means effective in removing organic compounds (other than the polyhydric alcohol(s)) from the pH-adjusted composition;

(vi) passing the pH-adjusted composition from the first filtration means through a second filtration means effective in the physical separation of particles of a smaller size that said first filtration means;

(vii) passing said pH-adjusted composition through a third filtration means having an effective physical separation of particles by size smaller than said second filtration means; and (viii) passing said pH-adjusted composition after filtration through an ion exchanger (anion and/or cation) effective in the removal of at least one solubilized heavy metal from said pH-adjusted composition.

Prior to addition of the precipitating agent the pH of the spent antifreeze/coolant is adjusted by addition of an effective pH-adjusting agent to adjust the effective pH to improve the precipitation of heavy metal(s) and is preferably adjusted to a pH between about 4.0 and about 7.5 and more preferably between about 4.5 and 7.0. This pH adjustment improves the precipitation of heavy metals present in the spent antifreeze/coolant while concurrently adjusting the pH at a sufficiently high pH so as to minimize acidic solubilization of heavy metal compounds. The pH-adjusting agent may be any organic or inorganic compound which effectively adjusts the pH to the selected pH, although it has been unexpectedly found that the use of nitric acid as the pH-adjusting agent in conjunction with the use of aluminum nitrate as the precipitating agent provides unexpected results for precipitating both solubilized and insoluble lead species and for removing oil components present in spent antifreeze/coolant from the cooling systems of internal combustion engines. Organic acids, acidic organic salts, inorganic acids and acidic inorganic salts are employable herein being effective in adjusting the pH of the antifreeze/coolant. Representative acids include nitric acid, phosphoric acid, sulfuric acid, hydrochloric acid, carboxylic acids, mixtures thereof and the like. It has been observed that salts useful as both pH-adjusting agents and/or precipitating agents include the following representative acidic salts: the chlorides and nitrate salts of calcium, magnesium, zinc, aluminum and iron; the sulfate salts of magnesium, zinc, aluminum and iron; and the like. It is beneficial to employ nitric acid as the pH-adjusting agent so as to prevent the introduction of corrosive anions and/or anions which may interfere with precipitation of heavy metals present in the spent antifreeze/coolant during the pH adjustment step, although the concurrent adjustment of pH and precipitation of heavy metal(s) with an acidic salt, e.g., preferably an aluminum nitrate hydrate such as $Al(NO_3)_3.9H_2O$, is within the scope of the instant invention.

The precipitating agent may be selected to provide for the formation of heavy metal(s) precipitate in the pH-adjusted antifreeze/coolant. The precipitating agent need not result in the actual formation of a solid precipitate if a coagulant and/or flocculant are to be employed but only need render heavymetal(s) and/or oil present in the spent antifreeze/coolant susceptible to precipitation in the presence of coagulant and flocculant. When the precipitating agent is employed without the use of a coagulant and/or flocculant, it has been observed that the rate of formation and separation of the precipitate may be too slow for effective commercial use of the process, although the benefits of instant process will nonetheless be achieved. The precipitating agent added in an effective amount to precipitate a selected amount of heavy metal(s) present in the spent antifreeze/coolant. As aforementioned, the heavy metals most commonly found in spent antifreeze/coolant are lead (Pb from lead solder corrosion), iron (Fe from water and radiator corrosion), zinc (Zn from metal corrosion and from zinc salts employed in antifreeze/coolants), copper (from radiator corrosion) and aluminum from corrosion (water pump, radiator, engine head and engine block). It has been observed that the concentrations of solubilized lead and iron in a spent antifreeze/coolant are on the order of up to about 100 parts per million (ppm) lead, and up to about 25 ppm iron, respectively. It has also been observed that insoluble lead components may be present in concentrations up to about 150 ppm and insoluble iron components may be present in concentrations up to about 600 ppm. Typically total concentrations of lead and iron are set forth in Table A, hereinbefore. The effective amount of precipitating agent for such concentrations of Pb and Fe will typically be between about 100 ppm and about 6000 ppm (based upon use of $Al(NO_3)_3.9H_2O$ as the precipitating agent) and preferably between about 500 ppm and about 5000 ppm. The effective amount of precipitating agent employed is related to the equivalents of heavy metal(s) to be precipitated and will vary depending upon the equivalents of the selected precipitating agents useful herein for forming heavy metal precipitates.

As aforementioned, selection of the precipitating agent may be from that group of organic and/or inorganic compounds effective in the formation of a substantially insoluble species of at least one heavy metal present in the spent antifreeze/coolant at the adjusted pH and may include salts of heavy metal(s) such as phosphates, chlorides, sulfates, oxalates and the like. The term "substantially insoluble" is meant to refer to a heavy metal species which will form as one or more precipitable species at a pH between about pH 4.0 and pH 7.5. Surprisingly, it has been found that use of aluminum nitrate $(Al(NO_3)_3.9H_2O)$ as a precipitating agent for lead after pH adjustment (to between about 4.0 and about 7.5) of the antifreeze/coolant with nitric acid (as the pH-adjusting agent) is particularly advantageous for use in formation of a lead precipitate and is also most beneficial for use in forming a precipitation with the additional use of a coagulant and/or flocculant. The exact mechanism by which aluminum nitrate beneficially provides for formation of a precipitate of lead is not fully understood but may relate to chemical reaction with lead and/or may involve physical adsorption of lead species on the surface of aluminum, hydroxide or an aluminum oxide or other aluminum species formed in situ by addition of aluminum nitrate.

The selection of the coagulant and flocculant is correlated to the alcohol-based antifreeze/coolant being treated and is made to provide for effective precipitation and filtration of the precipitate and separation of the precipitate by a mechanical filter. The coagulant may be any of the well known commercially available coagulants including Calgon 2466, Cyanamid 572C, mixtures thereof and the like. The flocculant may be any of the well known commercially available flocculants including PRIMAFLOC® C-3, MAG-NIFLOC® 572C, Calgon 7736, Cyanamid 1820A, mixtures thereof and the like. Calgon POL-E-Z® 2466 is a high molecular weight, high charge cationic polyelectrolyte available from Calgon Corporation. PRIMAFLOC® C-3 is a cationic polyelectrolyte flocculant characterized as a water-soluble polyamine (29–31%) and is available from Rohm and Haas Company. Calgon POL-E-Z® 7736 is a high molecular weight, anionic polyelectrolyte available from Calgon Corporation. MAGNIFLOC® 572C (flocculant) is a very low molecular weight, liquid cationic flocculant available from American Cyanamid Company. Cyanamid 1820A is a cationic flocculant available from American Cyanamid Company. The selection of coagulants and flocculants for precipitating solids in water based systems is well known as evidenced by the discussion in "The Nalco Water Handbook", Second Edition, (ISBM 0-07-045872-3), 1988, at Part 2, Chapter 8 at pages 8.3 to 8.23, incorporated herein by reference.

In one embodiment the antifreeze/coolant is a spent antifreeze/coolant from the cooling system of an internal combustion engine, typically from an automobile or truck, having its pH adjusted to between about 4.5 and about 7.0 with nitric acid as the pH-adjusting agent, followed by treatment with an effective amount of aluminum nitrate as the precipitating agent, followed by addition of coagulant, preferably Calgon 2466, and flocculant, preferably Calgon 7736. The effective amount of coagulant is typically between about 75 ppm and about 300 ppm, preferably between about 150 ppm and about 225 ppm. The effective amount of flocculant is typically between about 25 ppm and about 300 ppm and preferably between about 50 ppm and about 100 ppm. It has been observed that there is an effective concentration range of coagulant and flocculant in the coagulant and flocculant solutions when such are to be added to the antifreeze coolant after such has been treated with the pH-adjusting agent and the precipitating agent. Surprisingly, it has been found that commercially available coagulants and flocculants are sold at concentrations significantly greater than beneficially suitable for use in the instant process. For example, when treatment of a lead-containing automotive antifreeze/coolant is effected with Calgon 2466 as the coagulant and Calgon 7736 as the flocculant after the antifreeze/coolant has been treated with effective amounts of nitric acid and aluminum nitrate, it has been observed that the coagulant and flocculant as commercially available should be beneficially diluted from its original commercial concentration by the addition of water or other suitable solvent. For example, suitable dilution of coagulant Calgon 2466 and flocculant Calgon 7736 for use in the instant invention may be prepared by mixing 100 parts (by weight or by volume) of the coagulant or the flocculant with water to form up to 40,000 parts of coagulant or flocculant solution for use in the instant invention. The aforementioned water diluted mixtures will preferably result in effective concentrations of coagulant or flocculant in the resulting diluted water mixtures wherein the concentration of coagulant or flocculant is 0.25% to 5.0% of the concentration of the original commercial concentration of the coagulant or flocculant. Although the exact reason for the beneficial effect obtained by use of a diluted coagulant or flocculant and the beneficial correlation of the concentration of the coagulant and flocculant to the antifreeze/coolant is not fully understood it has been observed that such may be related to the unique chemical environment resulting from the use of an originally formulated ethylene-glycol based antifreeze/coolant in the cooling system of an internal combustion engine and from localized concentrations of coagulant or flocculant resulting from the inherent difficulty in mixing large volumes of liquids. The actual correlation in the concentration is believed to result in an effective concentration of coagulant and flocculant, as described above based upon the range of the heavy metals observed to be present in antifreeze/coolant removed from automotive cooling systems.

The antifreeze/coolant will form a solids phase (precipitate) and a liquid phase after treatment with the pH-adjusting agent and precipitating agent and An a further embodiment preferably treatment as to coagulant and flocculant, as described above. The precipitate may be removed by mechanical filtration. In addition, it has been observed that proper agitation of the treated antifreeze/coolant enables skimming of precipitate from the top of the treated antifreeze/coolant as some portion of the precipitate is present at the surface of the treated antifreeze/coolant. Further, it has been observed that recirculation of the spent antifreeze/coolant An the mixing tank by introduction of the recirculated stream above the surface of the antifreeze/coolant in the mixing tank is beneficial in forming a precipitate suitable for skimming as compared to the form of the precipitate formed when the recirculated stream is introduced below the surface of the antifreeze/coolant in the mixing tank. Accordingly, it is preferred to have a recirculation of the spent antifreeze/coolant in the mixing tank from below the surface of the antifreeze/coolant in mixing tank to a position sufficiently above the surface so as to expose the recirculated antifreeze/coolant to air whereby some degree of contact with air occurs, such having been observed as effective in improving the form of the precipitate for skimming. This preferred recirculation is preferably commenced prior to the addition of the pH adjusting agent and precipitating agent. It has been observed that the use of a process step wherein skimming of the surface of the treated antifreeze/coolant is employed is beneficial in reducing the amount of precipitate which must be removed by filtration. This reduction in the amount of precipitate to be removed by filtration both increases the rate at which the treatment process may be carried out and increases the useful life of the filtration means, thus decreasing the number of times the filtration means must be replaced. The effective particle size removed by the filtration means will depend in part on whether a single or multiple filtration steps are to be employed. If a single filtration step is to be employed the filtering means will preferably remove particles having a particle size greater than about 50 microns, although use of a single filtration step is not employed. If this first filtration is the first filtration means in a series of filtration means, then this first filtration means will preferably be effective in the removal of particles having a particle size greater than about 100 microns. In one embodiment it has been found to be beneficial to employ at least three filtration steps wherein the first filtration means is effective in removing species larger than about 100 microns, a second filtration means effective in removing species larger than about 40 microns and a third filtration means is beneficially employed wherein such is effective in removing species larger than about 5 microns. An optimal fourth filter may be employed wherein such fourth filtration means is effective in removing species larger than about 0.2 microns, preferably larger than about 0.1 microns. Mechanical filtration means having effective filtration sizes as above discussed are well known in the prior art. Optionally, as herein described, an organic separation filter may be provided in conjunction with the previously discussed mechanical filters.

In a further embodiment, the treated, filtered, spent antifreeze/coolant is passed through an active filter for the removal of organic compounds, e.g., oils, aldehydes and organic acids. Representative of such active filters are the various activated carbon filters sold under the tradename Fulflo™ by Parker Hannifin Corporation-Commercial Filters Group or a No. 2 Anthacite filter sold by Penfield Liquid Treatment. The Fulflo™ filter is characterized by its honeycomb filter structure having an activated carbon surface while the Penfield filter is a loosely packed carbon filter. The active carbon filter acts as an organic separation means effective in the selective removal of organic compounds from the polyhydric alcohol/water mixture forming spent antifreeze/coolant.

It has been found beneficial to provide two or more filtration means for the spent antifreeze/coolant (either before or after aforementioned organic separation means) to effectively remove materials greater than about 5 microns, and more preferably to remove materials greater than about 0.2 microns. It has been found that the use of one or more additional mechanical filtration steps in conjunction with a first filtration means step is most advantageous in the separation of bulky organic and inorganic compounds and both large and small particulate solids. Further, by providing a series of ever smaller size filters the likelihood of clogging smaller pore filters with larger materials is effectively eliminated. In one embodiment the process employs a first filtration means effective in removing materials greater than about 100 microns, a second filtration means effective in removing materials greater than about 40 microns, a third filtration means effective in removing materials greater than about 5 microns, and a fourth filtration means effective in removing materials greater than about 0.2 microns.

In a further embodiment the instant process may also involve treatment with at least one ion-exchange resin to remove solubilized species present in the spent antifreeze/coolant. A possible result of the initial pH-adjustment of the instant process is the formation of solubilized cationic and/or anionic species of one or more heavy metals. The pH-adjustment to a pH between about 4.0 and about 7.5 is selected so to minimize the formation of such solubilized cationic and/or anionic species of such heavy metals, especially solubilized lead species. Although it has been observed that no such solubilized cationic species (less than the lowest measurement limit of 2 ppm), e.g., solubilized lead, are present after the addition of the pH-adjustment agent, precipitating agent, coagulant and flocculant it is believed to be beneficial to treat the filtered, spent antifreeze/coolant with a cation and/or anion exchange resin to assure that essentially no solubilized heavy metal is present. It has also been observed that such ion exchangers also may act as filtration means for effectively removing materials having a size greater than about 2.0 microns. Further, since some solubilized species will pass through filtration means having a pore size greater than 0.005 and remain as solubilized species it is beneficial to employ an ion exchange material whereby such species are selectively removed by other than physical separation.

It is desirable to remove any solubilized heavy metals from the spent antifreeze/coolant so that such may be properly handled and properly disposed. Accordingly, the filtered, spent antifreeze/coolant may be treated with a cation exchange and/or anion exchange resin effective in the removal of solubilized heavy metal cation(s), or anions. Cation exchange resins useful in the removal of solubilized heavy metal cations include well known cation exchange resins such as Rohm and Haas DP-1, Rohm and Haas Amberlite® IRC-718, Duolite® C-464, Purolite® C-106 and Ionic® CNN. Rohm and Haas Amberlite® IRC 718 is preferred owing to its effectiveness in the removal of solubilized lead and its cost. Amberlite® IRC 718 is a chelating cation exchange resin having a high affinity for heavy metal cations over alkali or alkaline earth metals in the pH range between about 4.0 and about 7.5 and is formed from Dow Chemical Company's SBR resin; a styrene-divinyl benzene material and is available from Rohm and Haas. Anion exchange resins which may be employed herein include Rohm and Hass Amberlite® IRA 400; Purolite A-600; Ionic® ASB-1; and Duolite® A-109. It has been observed that the use of an anion exchange resin may not always be beneficial owing to the high concentration of anions present, present in the treated antifreeze/coolant, e.g., nitrate, in the treated antifreeze. Nevertheless, there may be instances where an anion exchange resin may be beneficially employed, e.g., where the anion exchange resin is selective to one or more anionic species. Further, it is well known that ion exchange resins having both cation and anion exchange characteristics are commercially available and such dual exchange resins may be employed herein. For-example the ion-exchange media of U.S. Pat. No. 4,908,137, incorporated herein, is believed to be a novel ion-exchange media useful herein in the removal of heavy metal ions.

The treatment with the cation and/or anion exchange resin ("ion exchange") may be accomplished after suitable mechanical filtration of the spent antifreeze/coolant after the addition of the pH-adjusting agent, precipitating agent, coagulant and flocculant has resulted in precipitation of insoluble heavy metal compounds. Since the presence of large particulate matter will tend to clog most ion exchange materials, it is preferred that the ion exchange step follow a mechanical filtration step where particles having a size greater than about 5 microns have been removed.

The reference to "filtration means" is meant to designate the various filtration devices hereto known in the prior art for use in the physical separation of materials (including both organic species and inorganic species) based on size. Filtration devices suitable for use in the instant invention are commercially available. For example, the first filtration means of 100 microns and above may be a 3M Brand liquid filter bag formed from polypropylene or stainless steel as described in 3M sales brochure 70-0701-3209-0(201)iii 1989, incorporated herein. The second filtration means having separation means of about 40 microns and above may be a 3M Brand liquid cartridge filter having a pleated polypropylene design as described in 3M sales brochure 70-0702-2790-8(201.5)ll, incorporated herein.

In one embodiment the treatment with a cation exchange resin may be replaced in part or in whole with treatment with an anion exchange resin. In some instances the heavy metal(s) may be present or may be converted into an anionic species. In some instances it may be beneficial to treat the spent antifreeze/coolant to form an anionic species of the heavy metal, since in some instances its removal as an anionic species may be more effective than its removal as a cationic species. The formation of such anionic species may be beneficial owing to the desire to increase the reserve alkalinity of the spent antifreeze/coolant in preparation for its reprocessing into a working antifreeze/coolant for use in an automotive cooling system.

The final composition obtained from the various embodiments of the instant invention are characterized as having lower concentrations of one or more heavy metal components and is typically characterized as being an aqueous composition(s) containing between about 5 and about 95 weight percent alcohol, preferably ethylene glycol, and containing less than about 5 ppm soluble lead, generally less than 2 ppm soluble lead. These aqueous polyhydric alcohol compositions may be employed in the manufacture of a working antifreeze by addition of corrosion inhibitors hereto employed in the manufacture of antifreeze/coolant compositions or may be employed for other common uses for the polyhydric alcohol.

When the use is for antifreeze/coolant, such corrosion inhibitors will be employed in effective amounts correlated to any residual concentration of components of corrosion inhibitors present from that present in the spent antifreeze/coolant which was not removed by the instant process. For example, solubilized silica and nitrate may be present in the compositions derived from the instant process, since the various steps of precipitation, organics separation and mechanical filtration may not be effective in their complete removal. Chemical analysis of the treated spent antifreeze/coolant will provide a basis for correlating the effective amount of corrosion inhibitor which should be added to the treated aqueous antifreeze/coolant to form an effective working antifreeze. In some instances the formation of a working antifreeze may also require the addition of ethylene glycol or fresh antifreeze or removal of water to obtain a solution having the desired freezing point. Removal of water from the aqueous ethylene glycol may be by distillation, extraction or other known separation means.

The various steps of the instant process may be carried out at an effective temperature wherein the antifreeze/coolant is in a liquid state and is preferably between about 18° C. to about 45° C. and at an effective pressure, preferably between about 0.9 atm to about 1.1 atm, or such other temperatures or pressures as may improve the process.

It has been observed that it is not preferred to pass the precipitate formed by addition of the pH-adjusting agent, precipitating agent, coagulant and flocculant through a high shear mechanical pump, since a high shear mechanical pump tends to form particles of smaller size by mechanical shearing, thus making it more difficult to remove particles with large size filters. Accordingly, it has been found that it is preferred to place a pumping means after the first filtration step which to provide a pulling action after the first filtration means or alternatively, provide a diaphragm or other low shearing type pump ahead of first filtration means. Representative of high shear pumps is a MOYNO® SP Pump (available from Robbins & Wyers, Inc.) and representative of a low shear pump is a Twin Diaphragm Pump (available from the ARO Corporation). It has also been observed that by employing skimming of precipitate from the surface of antifreeze/coolant in the vessel to which the pH-adjusting agent, precipitating agent, flocculant and coagulant are added that sufficient precipitate can be removed to significantly reduce the problems associated with high shear pumps.

The instant process may be carried out in a batch wise or, alternatively, in a continuous mode. When carried out in a batch mode, the process is conducted by placing a selected quantity of spent antifreeze/coolant in a vessel. The pH-adjusting agent and precipitating agent are added followed by addition of the coagulant and flocculant whereby a precipitate will be formed. The contents of the vessel are then filtered by a first filtration means to remove the precipitate from the liquid phase. It has been found advantageous to minimize the mechanical action on the precipitate during this first filtration step so as to minimize the fraction of smaller size particles which form as a result of mechanical abrasion. Such mechanical abrasion may be minimized by manual mixing for about 5 minutes after all ingredients have been added during which time it may be advantageous to skim precipitate from the surface of the mixture. The pH-adjusted composition may then be sequentially passed through one or more filtration means, organic separation means, additional filtration means and ion exchange means.

The treated antifreeze/coolant may be suitable for use as a component of a working antifreeze/coolant without further treatment or may be distilled to remove water and/or organic component and, thus, provide a higher content polyhydric alcohol solution. Alternately, the instant process is well suited to be carried out in a continuous manner based upon the process steps employed in the batchwise process discussed above.

The instant process may also be employed as a treatment step in an antifreeze/coolant change-over process where the treated antifreeze/coolant is returned to the cooling system of an internal combustion engine after the addition of inhibitors and other suitable chemicals. Processes wherein a treated antifreeze/coolant is reintroduced to an engine cooling system include U.S. Pat. Nos. 4,149,574, Re. 31,274, 4,791,890 and 4,792,403; said patents incorporated herein by reference. For example, in U.S. Pat. No. 4,793,403 the instant process may be substituted for the second means for treating the removed coolant (see: column 3, line 11 to column 3, line 28). In one embodiment the instant process is employed as the intermediate treatment step in the process of copending U.S. Ser. No. 200,347, filed May 31, 1988, entitled, "FLUSH AND FILL METHOD AND APPARATUS" incorporated herein by reference thereto. In such a process a first liquid (spent antifreeze/coolant) is removed from a cooling system through the radiator neck opening via an elongated hollow tube, treated according to the instant process and then reintroduced after treatment as the antifreeze/coolant (second liquid) into the cooling system via the radiator neck via an elongated hollow tube (the same or a second hollow tube). The treatment step is according to the instant invention and includes addition of appropriate chemicals to form a working antifreeze/coolant. The process of U.S. Ser. No. 200,347 eliminates the need to access the cooling system at more than one location and eliminates the need to cut hoses for access to the cooling system. In general, a process according to the instant invention used in conjunction with a process according to U.S. Ser. No. 200,347 comprises flushing/filling an automotive cooling system containing an antifreeze/coolant first liquid using a flushing apparatus comprising in combination a pumping means, liquid switching means, an elongated hollow tubular member and an automobile having an automobile radiator having a neck opening and an over-flow container, said neck opening and said over-flow container containing an antifreeze/coolant first liquid, to be replaced with an antifreeze/coolant second liquid (comprising the antifreeze/coolant first liquid treated according to the instant invention and then provided with an inhibitor package), wherein said elongated hollow tubular member forms an elongated open fluid passageway extending into the automobile radiator through said neck opening for accessing said antifreeze/coolant first liquid, one end of the elongated hollow tubular member adapted to engage a connecting means in a fluid tight relationship to connect the said elongated tubular member to said pump means and switching means and for removing said first liquid and for introducing said second liquid through said elongated hollow tubular member to said automobile radiator, said process comprising:

a) removing at least a portion of the antifreeze/coolant first liquid from the automotive cooling system through said elongated hollow tubular member using said pumping means connected to said liquid switching means;

b) treating said first liquid according to the instant invention and adding thereto an inhibitor package to form an antifreeze/coolant second liquid; and c) introducing said antifreeze/coolant second liquid to said automotive cooling system through said elongated hollow tubular member using said pumping means and switching means.

The instant process is beneficially carried out using a recycle apparatus comprising:

(i) holding means for holding said spent antifreeze/coolant;

(ii) pH adjusting means for adjusting the pH of said spent antifreeze/coolant with a pH adjusting agent; and (iii) addition means for adding a precipitating agent to said spent antifreeze/coolant.

In a further embodiment the recycle apparatus comprises:

(i) holding means into which a spent antifreeze/coolant may be placed;

(ii) pH adjusting means for adjusting the pH of the spent antifreeze/coolant in said holding means;

(iii) addition means for introducing into said holding means at least one of a precipitating agent, a coagulant and a flocculant;

(iv) pumping means for removing the spent antifreeze/coolant from said holding means;

(v) mechanical separation means for removing solids from said spent antifreeze/coolant based upon the size of said solids;

(vi) organic separation means for removing one or more components of said spent antifreeze/coolant on the basis of chemical reaction, chemical adsorption or chemical absorption; and (vii) ion exchange means effective in the removal by ion exchange of at least one solubilized metal species in said spent antifreeze/coolant.

In this embodiment the recycle apparatus typically includes at least items (i), (ii), (iii), (iv) and (v) whereby the recycle apparatus is effective in removing the precipitated solids in the holding means after addition of the pH adjusting agent and precipitating agent. Further, the mechanical separation means may actually be one or more filters effective in the removal of solids of various sizes, e.g., greater than 100 microns or 40 microns or 5 microns.

The holding means may be a storage tank of conventional design with inlet and outlet ports for introduction of the original spent or recirculated antifreeze/coolant and the treated antifreeze/coolant, respectively. A mechanical mixing or stirring means is typically employed to mix the contents of the holding means. The pH adjusting means and addition means may be any liquid or dry addition apparatus for introduction of the pH adjusting agent, precipitating agent, coagulant and/or flocculant. The pumping means may be any device effective in transferring the contents of the holding means to another process step or to another storage area, including displacement by the force of gravity. The mechanical separation means and organic separation means may be one or more filters as described in the instant application with reference to the instant process. The cation exchange means may be one or more of the cation and anion exchange resins described herein.

In addition to the above recycle apparatus it has been observed that it may be beneficial to employ skimming means and recirculating means in combination with the holding means, pH adjusting means and addition means. According to this embodiment the recycle apparatus comprises:

(i) holding means into which a spent antifreeze/coolant may be placed;

(ii) recirculating means for circulating spent antifreeze/coolant in said holding means from a point below the surface of said spent antifreeze/coolant to a point above the surface of said spent antifreeze/coolant, whereby the recirculated spent antifreeze/coolant contacts ambient air prior to its recirculation into said spent antifreeze/coolant;

(iii) pH adjusting means for adjusting the pH of the spent antifreeze/coolant in said holding means;

(iv) addition means for introducing into said holding means at least one of a precipitating agent, a coagulant and a flocculant;

(v) skimming means for removing solids from the surface of said spent antifreeze/coolant in said holding means; and (vi) may optionally contain one or more of mechanical separation means, organic separation means and ion exchange means, as discussed above.

EXAMPLES

The following examples are provided to further illustrate the invention and are not intended to be limiting thereof. As employed in the following examples the following abbreviations shall have the following meanings:

Wt. %: Weight Percent

EG: Ethylene Glycol

DEG: Diethylene Glycol

PG: Propylene Glycol

TTZ: Tolyltriazole $NO_3$: Nitrate $SO_4$: Sulfate

F: Fluoride

Cl: Chloride

EDTA: Ethylene Diamine Tetracetic Acid

TSS: Total Suspended Solids (ppm; gravimetric analysis with 0.45 micron filter)

Oil: Wt. % Oil as an insoluble organic phase. Elements are referred to by their chemical symbols, e.g., Al is aluminum, Pb is lead, and etc.

ml: milliliter

ND: None Detected at 2 ppm or higher.

Example 1

A spent antifreeze/coolant was obtained from commercial antifreeze/coolant change-over facilities and was from the cooling systems of automotive and truck engines. The spent antifreeze/coolant was treated according to the instant invention using the following equipment in the order listed:

(1) Mixing Tank;
(2) ½" Diaphragm pump;
(3) 32" Bag Filter (3M 527A, 99.99 at 20 micron);
(4) 12" Bag Filter (McMaster Carr 5167K56, 100 micron);
(5) 20" Cartridge Filter (Pall RF400, 40 micron);
(6) 10" Activated Carbon (Filter Fulflo RC10, 10 micron);
(7) 20" Filter (3M 323A, 2 micron); and
(8) Cation Exchange Resin (Rohm and Haas Amberlite® IRC-718).

A 5125 gallon sample of the spent antifreeze/cooling was placed in the mixing tank followed by the addition of 11.889 gallons of a 70 wt. percent nitric acid (remainder water). The contents of the mixing tank were then mixed by a mechanical mixer for 20 minutes. To this mixture was added 110.23 pounds of $Al(NO_3)_3 \cdot 9H_2O$ powder. This mixture was mixed for 60 minutes. To this mixture was added 200 gallons of 0.5 weight percent coagulant Calgon 2466 and 66.7 gallons of 0.5 weight percent flocculant Calgon 7736. The resulting mixture was then mixed for eight hours and filtered using the above noted filters in the order listed.

Tables I and II show the analysis of the spent antifreeze/coolant both before and after treatment by the process of this invention. In Table I, the analysis of ethylene glycol, diethylene glycol and propylene glycol was conducted by standard refractive index and gas chromotographic methods, the oil percent was conducted by a gas chromatography, the total suspended solids were conducted by gravimetric analysis and all other analyses were conducted by High Pressure Liquid Chromatography ("HPLC") analysis or Ion Chromatography ("IC"). Table II shows the results of ICP analyses of several metals in their soluble and insoluble forms both before treatment and after treatment according to the instant invention. In addition, the precipitate collected by the first 100 micron filter bag was analyzed. Table I and Table II demonstrate the effectiveness of the instant process in removing heavy metals, particularly lead, iron, copper, aluminum, magnesium, zinc and oil from spent antifreeze/coolant compositions. Referring to Table I, it is shown that in one embodiment of the instant process that after treatment the concentrations of TTZ, BZT, oil, benzoate, glycolate and total suspended solids ("TSS") have been reduced. Referring to Table II, it is shown that after treatment the soluble forms of aluminum, boron, calcium, iron, potassium, magnesium, molybdenum, phosphorus, lead, silicon and zinc are reduced. The insoluble forms of aluminum, boron, iron, magnesium, molybdenum, phosphorus, lead and zinc were reduced.

It is particularly important to note that after treatment according to the invention that no soluble or insoluble lead was present in the antifreeze/coolant down to the detection limits of ICP analysis (about 2 ppm) and, accordingly, is consistent with current and presently propossed regulations of the Environmental Protection Agency as being a non-hazardous material. Further, it has been observed that the form of the heavy metals in the precipitate is such that the heavy metals are not leachable by water. Further, the precipitate contains various useful metal components and may be recycled for use as a component in cements, concrete, or used in other metal layered areas.

TABLE I

ANTIFREEZE/COOLANT COMPOSITION
BEFORE AND AFTER CHEMICAL TREATMENT

| Analysis | Before Treatment | After Treatment |
|---|---|---|
| pH | 8.3 | 6.39 |
| EG, Wt % | 53.0 | 48.1 |
| DEG, Wt % | 2.0 | 1.9 |
| PG, Wt % | 0.33 | 0.34 |
| TTZ, ppm | 908 | 258 |
| BZT, ppm | 114 | ND |
| $NO_2$, ppm | 92 | 115 |
| $NO_3$, ppm | 1029 | 4166 |
| Benzoate | 3520 | 2896 |
| Oil, % | 0.5 | ND |
| F, ppm | 180 | 1.41 |
| Cl, ppm | 137 | 141 |
| $SO_4$, ppm | 290 | 259 |
| Acetate | 55 | 66 |
| Glycolate | 820 | 660 |
| Formate | 199 | 197 |
| Any acid, % | 0.05 | 0.04 |
| TSS, ppm | 509 | 19.0 |

TABLE II[1,2]

ANTIFREEZE/COOLANT COMPOSITION
BEFORE AND AFTER CHEMICAL TREATMENT

| ELEMENT NAME | SOLUBLE FORM Before | SOLUBLE FORM After | INSOLUBLE FORM Before | INSOLUBLE FORM After | PRE-CIPITATE |
|---|---|---|---|---|---|
| Al | 2.6 | ND | 6.1 | ND | 1340 |
| B | 434.8 | 303.6 | 23.7 | 3.2 | 1493 |
| Ca | 14.7 | ND | 6.7 | ND | 100.1 |
| Fe | 2.4 | ND | 23.6 | ND | 32.6 |
| K | 1206 | 986.6 | ND | ND | 789.5 |
| Mg | 8.1 | ND | 3.0 | ND | 30.6 |
| Mo | 48.5 | 20.5 | ND | ND | ND |
| Na | 2811 | 2308 | 65.0 | 30.9 | 2110 |
| P | 646.1 | 240.8 | 24.9 | ND | 95.8 |
| Pb | 3.0 | ND | 10.2 | ND | 11.5[3] |
| Si | 66.5 | 31.4 | 5.3 | ND | 15200 |
| Zn | 5.6 | ND | 5.4 | ND | 5.0 |

[1]Concentration in parts per million (ppm);
[2]ND means not detected at 2 ppm or higher
[3]EP Toxicity Testing (extractable lead) results were less than 0.1 ppm.

Example 2

Treatment of a spent antifreeze/coolant obtained from the cooling systems of automotive and truck engines was treated according to the instant invention using the following combination of equipment in the order listed:
(1) 30 gallon tank;
(2) ½" Diaphragm air pump;
(3) 12" 50 micron Bag Filter (McMaster Carr No. 5167K56);
(4) 20" 40 micron Cartridge (Pall No. RF400);
(5) 10" 10 micron Carbon Filter (Fulflo No. RC10);
(6) 20", 5 micron Cartridge Filter (Pall RF050); and
(7) 1.8 liter Cation Exchange Resin (Rohm and Haas Amberlite No. IRC-718)

A 10 gallon sample of a spent antifreeze/coolant was placed in the 30 gallon mixing tank followed by the addition of 60 ml of 70 weight percent nitric acid (remainder water). To this mixture was added 0.24 pounds of $Al(NO_3)_3.9H_2O$ powder. This mixture was mixed for 15 minutes. To this mixture was added 1135.5 ml of 0.5 weight percent coagulant Calgon 2466 and 378.5 ml 0.5 weight percent of flocculant Calgon 7736. The resulting mixture was then mixed for 30 minutes and filtered using the above noted filters in the order listed.

Table III shows an antifreeze/coolant and metals analysis of a spent antifreeze/coolant before treatment by the process of this invention. The analyses were conducted by ICP (Inductively Coupled Plasma) analysis. Tables IV and V show the result of ICP analysis of several metals and compounds in their soluble and insoluble forms both after a treatment step according to the instant invention. Tables IV and V demonstrate the effectiveness of the instant process in removing heavy metals, particularly lead and molybdenum, from spent antifreeze/coolant compositions. Referring to Table V, it is shown that in one embodiment of the instant process that after treatment the concentrations of the soluble forms of potassium, molybdenum, boron, iron, phosphorus and silicon are reduced. The insoluble forms of aluminum, calcium, iron, magnesium, sodium, silicon, phosphorus, lead and zinc were reduced. Further, reference to Table IV demonstrates the ability of the instant process to remove TTZ and benzoate as well as reduce the total suspended solids in the treated antifreeze/coolant.

It is particularly important to note that after treatment according to the invention that no detectable lead was present in the antifreeze/coolant down to the detection limits of ICP analysis (less than about 2 ppm). Further, since the antifreeze/coolant was passed through a 5 micron filter and the cation exchange resin (having an effective filter size of 2.0 microns) the final treated antifreeze/coolant meets current regulations of the Environmental Protection Agency for being a non-hazardous material on the basis of lead content. (40 C.F.R. 261.24). Further, it has been observed that the form of the heavy metals in the instant precipitate is such that the heavy metals are not leachable by water.

TABLE III

A. ANTIFREEZE/COOLANT COMPOSITION BEFORE CHEMICAL TREATMENT[1]

| pH | 9.42 |
|---|---|
| EG Wt % | 32.2 |
| DEG Wt % | 1.2 |
| PG Wt % | 0.6 |
| Cl | 25 |
| SO₄ | 91 |
| TTZ | 262 |
| NO₂ | ND |
| NO₃ | 472 |
| Benzoate | 652 |
| TSS | 650 |

[1]Values are in micrograms per milliliter; ND means not detected at 2 ppm or higher.

B. SOLUBLE SPECIES BEFORE TREATMENT

| ELEMENT | AVERAGE[1] |
|---|---|
| Al | ND |
| B | 179.8 |
| Ca | ND |
| Cu | ND |
| Fe | 11.5 |
| K | 334.9 |
| Mg | ND |
| Mo | 9.7 |
| Na | 1509.0 |
| P | 464.0 |
| Pb | ND |
| Si | 70.7 |
| Sn | ND |
| Zn | ND |

[1]Values are in ppm; ND means not detected at 2 ppm or higher.

C. INSOLUBLE SPECIES BEFORE TREATMENT

| ELEMENT | AVERAGE[1] |
|---|---|
| Al | 13.6 |
| B | 9.9 |
| Ca | 10.2 |
| Cu | ND |
| Fe | 80.7 |
| K | ND |
| Mg | 3.5 |
| Mo | ND |
| Na | 47.5 |
| P | 24.9 |
| Pb | 26.6 |
| Si | 10.7 |
| Sn | ND |
| Zn | 7.4 |

[1]Values are in ppm. ND means not detected at 2 ppm or higher.

TABLE IV

| ELEMENT[1] MEASURED | AFTER 50μ FILTER | AFTER 40μ FILTER | AFTER CARBON FILTER | AFTER 5μ FILTER | AFTER CATION EXCHANGE RESIN |
|---|---|---|---|---|---|
| Wt % EG(GC) | 28.3 | 28.5 | 28.3 | 28.5 | 28.5 |
| Wt % EG(RI) | 29.9 | 30.0 | 29.8 | 30.0 | 30.0 |
| pH | 6.7 | 6.8 | 6.7 | 6.8 | 7.9 |
| Wt % DEG | 1.05 | 1.02 | 0.98 | 0.99 | 0.96 |
| Wt % PG | 0.51 | 0.51 | 0.51 | 0.48 | 0.51 |
| F | 76 | 74 | 75 | 76 | 77 |
| Cl | 23 | 23 | 23 | 23 | 25 |
| SO₄ | 96 | 97 | 98 | 97 | 107 |
| TTZ | 206 | 235 | 90 | 101 | 61 |
| NO₃ | 3141 | 3017 | 2759 | 3103 | 3105 |
| BENZOATE | 325 | 318 | 250 | 232 | 247 |
| TSS/PPM | 456 | 112 | 68 | 36 | 24 |

TABLE V

| | AFTER 50 MICRON BAG | | AFTER 40 MICRON FILTER | |
|---|---|---|---|---|
| | SOL | INS | SOL | INS |
| Al | ND | 131.7 | ND | 11.7 |
| B | 155.8 | 16.8 | 161.8 | 9.7 |
| Ca | ND | 6.8 | ND | 4.0 |
| Cu | ND | ND | ND | ND |
| Fe | ND | 32.2 | ND | ND |
| K | 499.5 | 23.3 | 513.1 | ND |
| Mg | ND | 2.0 | ND | ND |
| Mo | 7.7 | ND | 8.1 | ND |
| Na | 1414 | 73.2 | 1434 | 21.6 |
| P | 190.9 | 161.2 | 194.7 | 7.8 |
| Pb | ND | ND | ND | ND |
| Si | 34.7 | 11.8 | 35.4 | 12.2 |
| Sn | ND | ND | ND | ND |
| Zn | ND | 3.8 | ND | ND |

| | AFTER CARBON | | AFTER 5 MICRON FILTER | | AFTER CATION EXCHANGE RESIN | |
|---|---|---|---|---|---|---|
| ELEMENT | SOL | INS | SOL | INS | SOL | INS |
| Al | ND | 21.1 | ND | 3.2 | ND | 4.0 |
| B | 162.3 | 10.7 | 156.3 | 8.6 | 147.2 | 11.6 |
| Ca | 2.6 | 4.0 | 2.1 | 2.3 | 2.2 | 3.1 |
| Cu | ND | ND | ND | ND | ND | ND |
| Fe | ND | 3.1 | ND | ND | ND | ND |
| K | 526.7 | ND | 509.6 | ND | 252.3 | ND |

TABLE V-continued

| | | | | | | |
|---|---|---|---|---|---|---|
| Mg | ND | ND | ND | ND | ND | ND |
| Mo | 8.7 | ND | 8.3 | ND | ND | ND |
| Na | 1495 | 27.1 | 1440 | 19.2 | 1962 | 29.3 |
| P | 205.1 | 18.6 | 199.0 | ND | 202.0 | ND |
| Pb | ND | ND | ND | ND | ND | ND |
| Si | 34.8 | 3.9 | 33.9 | 3.0 | 33.7 | 6.5 |
| Sn | ND | ND | ND | ND | ND | ND |
| Zn | ND | ND | ND | ND | ND | ND |

Example 3

A spent antifreeze/coolant was obtained from a commercial establishment in the business of changing over spent antifreeze/coolant from automobiles and trucks. A portion of spent antifreeze was treated according to one of the following chemical treatments to demonstrate the effect of changes in the pH-adjusting agent, precipitating agent, coagulant and flocculant on the treatment process. The coagulant in each treatment was Calgon 2466 and the flocculant was Calgon 7736. The treatment process was carried out and the analysis conducted as set forth, except as noted below in Example 2 for following ten (10) different chemical treatments and except the antifreeze/coolant sample size which was treated was 500 milliliters.

| TREATMENT NO. | CHEMICAL TREATMENT |
|---|---|
| 1 | The pH of the sample was adjusted to about 7.0 with organic acid (acetic acid - $CH_3COOH$, 99.7% solution); by treatment with 0.75 ml of organic acid followed by addition of 1.3 grams of $Al(NO_3)_3.9H_2O$, followed by addition of 30 milliliters (ml) coagulant (0.25% volume) solution, and then followed by addition of 10 ml. of 0.25% flocculant solution. |
| 2 | The pH of the sample was adjusted to about 7.0 with 1.9 grams of $Ca(NO_3)_2.2H_2O$ (without addition of any pH adjusting agent, coagulant and flocculant). |
| 3 | The pH of the sample was adjusted to about 7.0 with 0.75 ml of inorganic acid (70 wt % nitric acid, followed by treatment with 1.3 grams of $Al(NO_3)_3.9H_2O$ as the precipitating agent and then followed by addition of 30 ml of a 0.25% solution of the coagulant. |
| 4 | The pH of the sample was adjusted to about 7.0 with 0.75 ml of nitric acid solution (70 wt % $HNO_3$), followed by addition of 1.3 grams $Al(NO_3)_3.9H_2O$ as a precipitating agent, followed by addition of a 10 ml of 0.25 wt % solution of the flocculant. |
| 5 | The pH of the sample was adjusted to about 7.0 with 0.75 ml, nitric acid aqueous solution (70 wt % $HNO_3$); followed by addition of 1.3 grams of $Al(NO_3)_3.9H_2O$, followed by addition of 10 ml of a 0.25 wt % aqueous solution of the flocculant, and then followed by addition of 30 ml of a 0.25 wt % solution (aqueous) of the coagulant. |
| 6 | The pH of the sample was adjusted to a pH of about 7.0 by addition of 0.75 ml of aqueous nitric acid (70 wt % $HNO_3$), followed by treatment with 1.3 grams $Al(NO_3)_3.9H_2O$, followed by addition of 10 ml of a 0.25 wt % solution coagulant, and then 30 ml of the 0.25 wt % aqueous flocculant solution. |
| 7 | The pH of the sample was adjusted to about pH 7.0 with 0.75 ml aqueous nitric acid (70 wt % $HNO_3$); and then mixed with 1.3 grams $Al(NO_3)_3.9H_2O$ followed by addition of 30 ml of a 0.25 wt % aqueous solution of coagulant, and then followed by addition of 10 ml of a 0.25 wt % aqueous solution of flocculant. |
| 8 | The pH of the sample was adjusted to about pH 7.0 with 0.75 ml of nitric acid (70% $HNO_3$); followed by treatment with 1.3 grams $Al(NO_3)_3.9H_2O$ followed by addition of 15 ml of a 0.5 wt % solution of coagulant and then followed by addition of 5 ml of a 0.5 wt % solution of the flocculant. |
| 9 | The pH of the sample was adjusted to about pH 7.0 by addition of 0.7 ml of an aqueous formic acid solution (88% Formic acid - HCOOH) followed by addition of 1.3 grams of $Al(NO_3)_3.9H_2O$, followed by addition of 30 ml of a 25 wt % aqueous solution of coagulant, and then followed by addition of 10 ml of a 0.25 wt % aqueous solution of flocculant. |
| 10 | The sample was treated with 30 ml of a 0.25 wt % aqueous solution of the coagulant and with 10 ml of a 0.25 wt % solution of the flocculant (comparative sample without pH-adjusting agent and without precipitating agent). |

Each of the above samples were then filtered through a 25 micron filter and the final treated antifreeze/coolant analyzed. The results of the analyses are set forth in Table VI. Table VI demonstrates that surprising results obtained by use of the adjustment of the pH to between about 4.0 and about 7.5, the use of a precipitating agent and the use of several concentrations of coagulant and flocculant.

TABLE VI

| | TREATMENT NO. | | | | | | | | | | |
|---|---|---|---|---|---|---|---|---|---|---|---|
| | CONTROL[1] | 1 | 2 | 3 | 4 | 5 | 6 | 7 | 8 | 9 | 10 |
| pH | 9.1 | 5.87 | 7.5 | 5.54 | 5.18 | 5.39 | 5.41 | 5.55 | 5.25 | 5.13 | 9.1 |
| Al, ppm | 15.9 | ND | ND | ND | ND | ND | ND | ND | ND | ND | 3 |
| B, ppm | 146.2 | 125 | 147 | 127 | 125 | 125 | 121 | 127.4 | 130.6 | 129.4 | 128 |
| Ca, ppm | 3.2 | 2.4 | 33.2 | 3.0 | 3.4 | 2.8 | ND | 2.8 | 3.5 | ND | ND |
| Fe, ppm | 24.7 | ND | ND | ND | ND | ND | ND | ND | ND | ND | 3.0 |
| K, ppm | 640.0 | 506 | 604 | 483 | 522 | 490 | 487 | 490.0 | 506.4 | 517.0 | 507.0 |
| Mg, ppm | ND[2] | ND | ND | ND | ND | ND | ND | ND | ND | ND | ND |
| Mo, ppm | 16.7 | 12.3 | 12.8 | 11.9 | 12.4 | 12.1 | ND | 11.8 | 12.2 | ND | 13.3 |
| Na, ppm | 1471 | 1319 | 1437 | 1366 | 1367 | 1331 | 1350 | 1295 | 1365 | 1426 | 1210 |
| P, ppm | 444 | 142 | 61.9 | 139 | 137 | 140 | 136 | 141 | 147 | 139 | 331 |
| Pb, ppm | 19.7 | ND | ND | ND | ND | ND | ND | ND | ND | ND | 2.8 |
| Si, ppm | 109.3 | 44.7 | 55.2 | 44.5 | 45.9 | 39.8 | ND | 40.7 | 40.6 | ND | 42.0 |
| Zn, ppm | 7.2 | ND | ND | ND | ND | ND | ND | ND | ND | ND | ND |

[1]Antifreeze/Coolant prior to treatment as obtained from the cooling systems of automobiles/trucks.
[2]"ND" means not detected at 2 ppm or higher.

The results in Table VI demonstrate the adjustment of the pH and use of the precipitating agent (e.g. Treatment Nos. 6 and 9) followed by addition of the coagulant and flocculant was more effective than use of only the coagulant and flocculant (e.g., Treatment No. 10), or by use of only $Ca(NO_3)_2 \cdot 2H_2O$ as the precipitating agent (Treatment No. 2). When a process according to this invention is employed (as in Treatment Nos. 6 and 9) it is observed that the treated solutions from Treatment Nos. 6 and 9 have reduced concentrations of iron, molybdenum, silicon and zinc below detection limits (2 ppm). Further, while both Treatments 6 and 9 removed detectable solubilized lead, Treatment No. 10 (employing only coagulant and flocculant addition) gave a treated product containing 2.8 ppm Pb, 3.0 ppm Fe, 3.0 ppm Al and 13.3 ppm Mo.

Example 4

The process employed in example 3 (Treatment No. 7) was repeated using a propylene glycol-based antifreeze/coolant having the composition shown in Table VII. The propylene glycol-based antifreeze/coolant had been employed as the antifreeze/coolant in an automotive cooling system to provide the "original used antifreeze/coolant" employed in the instant example. The treatments with the pH-adjusting agent ($HNO_3$), precipitating agent ($Al(NO_3)_3 \cdot 9H_2O$), coagulant (Calgon 2466) and flocculant (Calgon 7736) were conducted as described in Example 3 to provide a treated propylene glycol-based antifreeze/coolant as shown in Table VII, below. As shown in Table VII, the instant process was effective in removing an amount of potassium, phosphorus and Total Suspended Solids and from the original used antifreeze/coolant. Since the original used antifreeze/coolant did not contain several metals at detection levels above about 2 ppm, the removal of these metals by the process of this invention could not be quantitatively evaluated.

TABLE VII

| | PROPERTIES OF ANTIFREEZE/COOLANT | |
|---|---|---|
| TEST | ORIGINAL USED ANTIFREEZE/COOLANT | AFTER TREATMENT |
| pH | 8.2 | 6.1 |
| PG, % | 52.5 | 49.8 |
| TTZ | 28 | 26.0 |
| Benzoate | ND | ND |
| $NO_3$ | 803 | 3700 |
| $SO_4$ | 171 | 152 |
| F | 80 | 66 |
| Cl | 50 | 50 |
| TSS | 238 | 14 |
| Al, ppm | ND | ND |
| B, ppm | 367.1 | 307.4 |
| Ca, ppm | ND | ND |
| Cu, ppm | ND | ND |
| Fe, ppm | ND | ND |
| K, ppm | 94 | 59.5 |
| Mg, ppm | ND | ND |
| Mo, ppm | ND | ND |
| Na, ppm | 2083 | 1759 |
| P, ppm | 749.8 | 285.4 |
| Pb, ppm | ND | ND |
| Si, ppm | 57 | 48.8 |
| Sn, ppm | ND | ND |
| Zn, ppm | ND | ND |

We claim:

1. A process for the treatment of an aqueous antifreeze/coolant composition obtained from the cooling system of internal combustion engines containing between about 5 weight percent and about 95 weight percent of a polyhydric alcohol selected from the group consisting of ethylene glycol, diethylene glycol and propylene glycol and mixtures thereof and containing at least one solubilized heavy metal species selected from the group consisting of lead, molybdenum, iron, zinc, and copper, wherein said process comprises the following steps:

(i) adjusting the pH of said aqueous antifreeze/coolant composition to between about 4.0 and about 7.5 by addition of an effective amount of a pH adjusting agent to form a pH-adjusted composition and adding an effective amount of a precipitating agent effective in forming a precipitate of said heavy metal species;

(ii) adding to said pH-adjusting composition an effective amount of at least one of a coagulating agent and a flocculating agent to form a heavy metal containing precipitate;

(iii) passing said pH-adjusted composition of step (ii) and said heavy metal containing precipitate through a first filtration means capable of removing species having a size greater than about 100 microns;

(iv) passing said pH-adjusted composition of step (iii) through a second filtration means capable of removing species greater that about 40.0 microns;

(v) passing the pH-adjusted composition from step (iv) through an organic separation means effective in removing organic compounds from said polyhydric alcohol of said pH-adjusted composition;

(vi) passing said pH-adjusted composition through a third filtration means capable of removing species greater than about 5 microns; and (vii) passing said pH-adjusted composition of step (vi) through a cation exchange means effective in the removal of at least one solubilized heavy metal species present in said pH-adjusted composition from step (vi).

2. A process according to claim 1 wherein said pH-adjusted composition contains water and said process comprises the additional step of:

(viii) passing said pH-adjusted composition of step (vii) through water removal means whereby between about 10 weight percent and about 100 weight percent of said water is removed from said pH-adjusted composition.

3. A process according to claim 2 wherein said water removal means is distillation means.

4. A process according to claim 1 wherein said heavy metal is lead.

5. A process according to claim 1 or claim 4 wherein said polyhydric alcohol comprises a mixture of ethylene glycol and diethylene glycol.

6. A process according to claim 5 wherein said ethylene glycol is present in an amount of between 5 and 95 volume percent.

7. A process according to claim 1 wherein said cooling system is an automotive cooling system.

8. A process according to claim 1 wherein said polyhydric alcohol is propylene glycol.

9. A process according to claim 1 wherein the pH in step (i) is between about 4.5 and about 7.5.

10. A process according to claim 1 wherein the pH-adjusting agent is at least one pH-adjusting agent selected from the group consisting of organic acids, inorganic acids, acidic organic salts, acidic inorganic salts and mixtures thereof.

11. A process according to claim 10 wherein the pH-adjusting agent is selected from the group consisting of nitric acid, phosphoric acid, sulfuric acid, hydrochloric acid, carboxylic acids and mixtures thereof.

12. A process according to claim 11 wherein said pH-adjusting agent is nitric acid.

13. A process according to claim 1 wherein said precipitating agent is selected from the group consisting of chlorides, sulfates, phosphates, aluminum nitrates, and mixtures thereof.

14. A process according to claim 1 wherein the flocculating agent is an anionic flocculating agent.

15. A process according to claim 1 wherein the coagulating agent is a cationic coagulating agent.

16. A process according to claim 1 wherein the flocculating agent is an anionic flocculating agent and the coagulating agent is a cationic coagulating agent.

17. A process according to claim 1 wherein said coagulating agent is present in an effective amount between about 75 ppm and about 300 ppm and said flocculating agent is present in an effective amount between about 25 ppm and about 100 ppm.

18. A process according to claim 1 wherein said antifreeze/coolant composition contains 5 volume percent to 95 volume percent ethylene glycol, contains up to 250 ppm lead, said pH-adjusting agent is nitric acid, said precipitating agent is $Al(NO_3)_3 \cdot 9H_2O$, said coagulating agent is present in an effective amount between about 75 ppm and about 300 ppm and said flocculating agent is present in an effective amount between about 25 ppm and about 300 ppm.

19. A process according to claim 1 or claim 18 wherein said pH-adjusted composition contains less heavy metal than said aqueous composition after addition of said precipitating agent.

20. A process according to claim 1 wherein said first filtration means has an effective separation for species greater than 40 microns.

21. A process according to claim 1 wherein:
said organic separation means is an activated carbon filter.

22. A process according to claim 1 wherein said process is carried out at an effective temperature between about 18° C. and about 45° C. and at an effective pressure between about 0.9 atm and about 1.1 atm.

23. A process according to claim 1 wherein a low-shear pump is provided before said first filtration means.

24. A process according to claim 1 wherein said pH-adjusted composition contains less than 2 ppm lead.

25. In a process for the removal of an antifreeze/coolant containing between about 5 wt. % and about 95 wt. % of a polyhydric alcohol and at least one heavy metal from the cooling system of an internal combustion engine and replacement of said antifreeze/coolant after treatment wherein said process comprises the steps of:

(a) adjusting the pH of said aqueous antifreeze/coolant to between about 4.0 and about 7.5 by addition of an effective amount of a pH adjusting agent to form a pH-adjusted composition and adding thereto an effective amount of a precipitating agent for said heavy metal;

(b) adding to the pH-adjusted composition an effective amount of coagulating agent and an effective amount of a flocculating agent to form a precipitate containing at least one heavy metal;

(c) passing the pH-adjusted composition through a first filtration means to remove heavy metal-containing precipitate from said pH-adjusted composition; and (d) adding to the filtered composition of step (c) an effective amount of corrosion inhibiting agents for said cooling system.

26. A process according to claim 25 wherein prior to step (d) at least one of the following steps is employed:

(1) passing said pH-adjusted composition through a second filtration means capable of removing species greater than about 40 microns;

(2) passing the pH-adjusted composition through an organic separation means effective in removing organic compounds other than said polyhydric alcohol from said pH-adjusted composition;

(3) passing said pH-adjusted composition through one or more additional filtration means capable of removing species greater than about 0.2 microns; and (4) passing said pH-adjusted composition through an ion exchange means effective in the removal of at least one solubilized heavy metal present in said pH-adjusted composition.

27. A process according to claim 25 or claim 26 wherein said aqueous antifreeze/coolant is a heavy metal-containing ethylene glycol-containing antifreeze/coolant taken from the cooling system of an internal combustion engine having a pH between about 8.2 and about 10.

28. A process according to claim 25 wherein said inhibiting agents are at least one selected from the group consisting of silicone/silicates, monoaliphatic acids, di-aliphatic acids, molybdates, carbonates, silicates, nitrates, nitrites, azoles, zinc compounds, calcium compounds, phosphates and benzoates.

29. A process according to claim 28 wherein said inhibiting agents are at least one selected from the group consisting of mono-aliphatic acids, dialiphatic acids, molybdates, silicates, nitrates and azoles.

30. A process according to claim 28 wherein said azole is selected from the group consisting of tolyltriazole, mercaptobenzotriazole, benzotriazole and mixtures thereof.

* * * * *